June 7, 1966  R. S. FARR ETAL  3,254,475
MIST COLLECTOR
Filed July 30, 1963
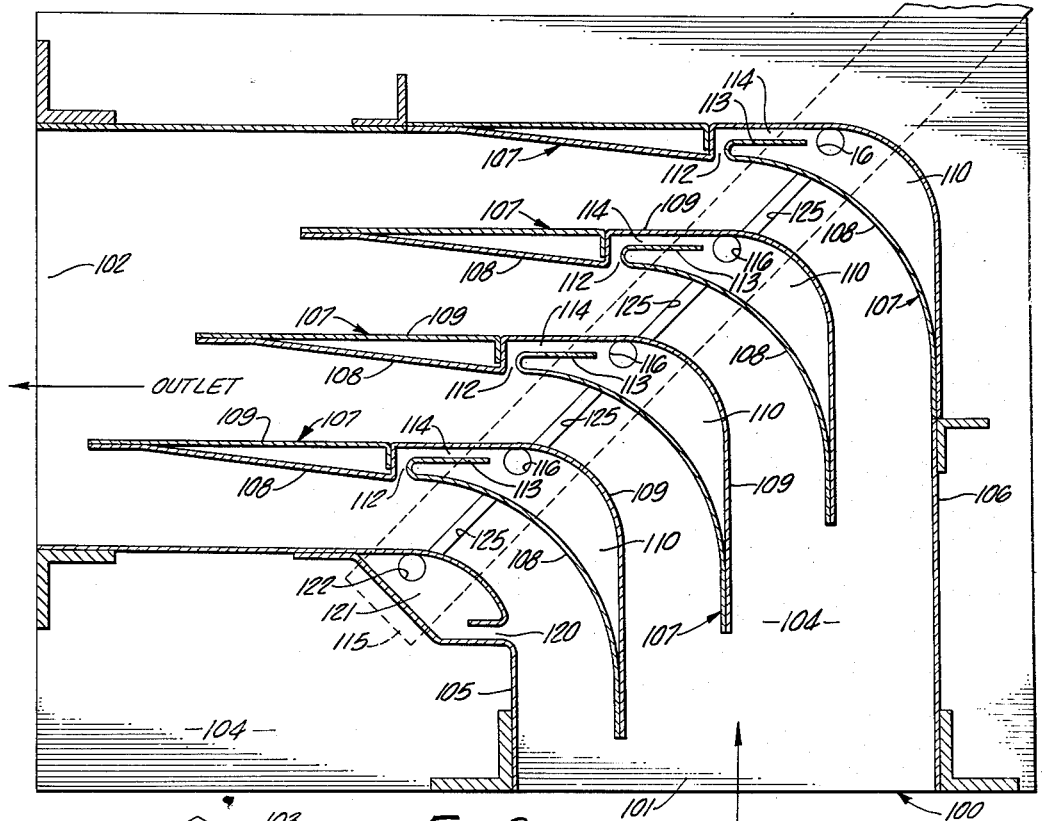
FIG. 2.
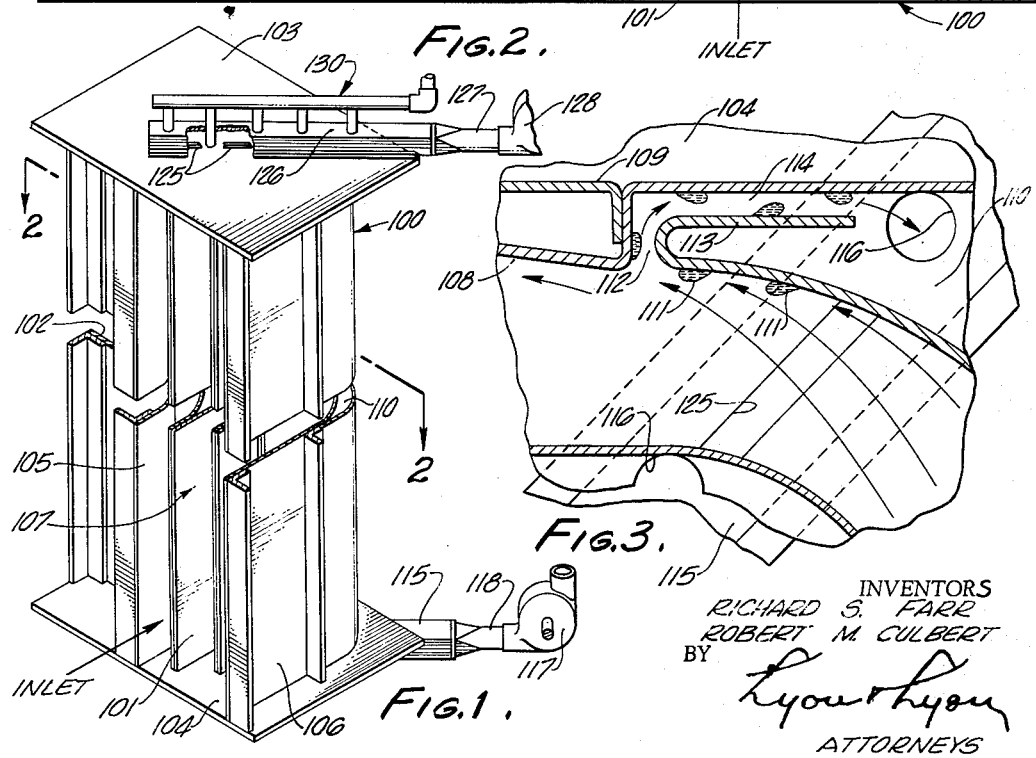
FIG. 3.
FIG. 1.
INVENTORS
RICHARD S. FARR
ROBERT M. CULBERT
BY Lyon & Lyon
ATTORNEYS

United States Patent Office 3,254,475
Patented June 7, 1966

3,254,475
MIST COLLECTOR
Richard S. Farr, Los Angeles, and Robert M. Culbert, Manhattan Beach, Calif., assignors to Farr Company, El Segundo, Calif., a corporation of California
Filed July 30, 1963, Ser. No. 298,769
7 Claims. (Cl. 55—242)

This invention relates to a device for extracting or removing mist and droplets of liquid from a flowing stream of air or other gas.

There are numerous situations where it is desirable or necessary to remove mist and droplets of liquid that are entrained in a stream of gas conducted to or from a system for handling the gas due to the adverse effects such mist or liquid may have on other components or operations in the system or the ultimate intended use of the gas. By way of one example, although numerous other examples could be cited, many air filters employing dry type filter media are adversely affected and prematurely clogged if a substantial quantity or concentration of liquid is present in the air supplied to such filter.

One of the more conventional devices for removing liquid from a gas stream employs a mat of geometrically or randomly arranged fibers through which the gas stream is passed. The droplets and mist of liquid impinge and collect on the fibers and are thereby extracted from the gas passing through the mat. The liquid then drains by migrating downwardly on the fibers of the mat. It has been found that since the liquid present on the fibers of the mat is exposed to the gas stream flowing through the mat that some of the liquid will migrate to the downstream extremity of the mat where some liquid may be discharged from the mat and again become entrained in the flowing gas stream thereby partially defeating the function of the fibrous mat. As a result it is generally necessary to provide a mat of such a size that the velocity of the gas stream therethrough is relatively low to minimize this inherent characteristic of causing the liquid to re-entrain in the gas stream. Moreover, since the liquid extracted by the mat is continually exposed to the flowing gas stream there is a tendency to evaporate the liquid and for this vapour to be carried through the mat in the gas stream. This evaporation causes the gas stream to tend to become saturated with vapour which in itself may be undesirable. Further, if the liquid contains dissolved or suspended solids then this evaporation of the liquid will cause such solids to be deposited on the fibers of the mat. This depositing of solids tends to clog the fibrous mat thereby requiring periodic maintenance or replacement.

Another of the more conventional devices for removing mist and droplets of liquid from a flowing gas stream employs a plurality of spaced vertical vanes of a shape causing the gas stream passing therethrough to assume a tortuous path. The one or more changes in direction of the flowing gas stream produced by the vanes causes the liquid entrained in the gas to impinge upon the vanes due to the inertia of such liquid. The liquid tends to adhere to the vanes and drains downwardly to the bottom where it is removed. However, as with the fibrous mat type device, the draining liquid is exposed to the flowing gas stream thereby tending to evaporate the liquid and re-entrain the liquid in the gas stream at the downstream edge of the vanes. It has been found with these conventional devices that in order to minimize the quantity of liquid which becomes re-entrained in the gas stream by virtue of being discharged from the downstream edge of the vanes that it is necessary to maintain a relatively low velocity of the gas stream through the vanes. However, employing a low velocity through this type of device reduces the effectiveness of the device since the inertial effect desired for extracting the liquid is a function of the velocity of the gas stream past the vanes.

Heretofore these conventional mist and droplet collectors have been used in installations where the low gas stream velocity therethrough required for satisfactory operation could be tolerated. For example such installations have been downstream of conventional air washers and scrubbers in which atomized liquid is sprayed directly into the air stream for accomplishing various functions such as the transfer of heat, the absorption of vapours, the collection of dust and dirt, and the collection of rain drops. It has been found that the nature and operation of this liquid spraying function has limited the practical air velocities to values compatible with these existing designs of mist and droplet collectors.

However, with the increased application of gas turbines to fixed power plants and moving vehicles, the function and problem of droplet removal becomes of paramount importance and particularly if the droplets contain dissolved solids such as in sea water spray. The air intake velocities of gas turbines are necessarily greater by ten or more times the velocities encountered in previous applications of droplet collectors because of the large air demands and also the requirements of compactness of a gas turbine power plant. Moreover the air pressure at the intake of the gas turbine is extremely important to the operating efficiency of the gas turbine and therefore it is imperative that any filtering and eliminating devices used with the gas turbine develop a very minimal pressure drop thereacross. While pure water will evaporate in a gas turbine without causing damage, impure water will evaporate and leave deposits of solids at various locations in the power plant resulting in inefficient and shorter lived operation. These problems are particularly and prominently present in the use of gas turbines on sea-going vessels where sea water spray is often present in the intake air and the space available for providing a mist and droplet collector is limited.

By this inventon there is provided a device having vanes for inertially extracting mist and droplets of liquid from a flowing gas stream wherein a high velocity gas stream may be employed and the liquid is rapidly removed from the influence of the flowing gas stream to minimize re-entrainment and evaporation of the liquid.

An object of this invention is to provide a novel form of vane type mist collecting device wherein the velocity of the gas stream through the device is not inherently limited by the device itself whereby the size of the device is minimized for the quantity of gas that is handled.

A further object of this invention is to provide a novel form of mist collecting device wherein the liquid that is extracted from a flowing stream of gas is rapidly removed from the path of such stream of gas to thereby minimize the evaporation of extracted liquid.

Another object of this invention is to provide a novel form of mist collecting device in the form of a turning elbow employing plural turning vanes for causing liquid to be deposited on the vanes by inertial effect wherein the liquid is removed from the vanes and the influence of the gas stream through enclosed conduits before the liquid can migrate to the trailing edge of the vanes and be re-entrained in the gas stream.

Still a further object of this invention is to provide a novel form of mist collecting device wherein the liquid extracted from the gas stream rapidly migrates to a conduit that is relatively unaffected by the flowing gas stream. A still further object is to provide such a device wherein a fluid may be introduced into such conduit either continually or intermittently to wash the extracted liquid and any solid particles from such conduits of the device even during operation of the device. And a further object is to provide such a device wherein a small amount of air is drawn off through such conduits to enhance the removal of liquid droplets and mist.

A still further object of this invention is to provide a novel form of mist collecting device in the form of a turning elbow for efficiently changing the direction of gas flow with a minimum pressure drop thereacross as well as collecting mist by means of plural turning vanes.

Other and more detailed objects and advantages of this invention will appear from the following description and the accompanying drawings.

In the drawings:

FIGURE 1 is a perspective view of the mist collector device of this invention with a portion shown in section.

FIGURE 2 is a sectional plan view of the mist collector device illustrated in FIGURE 1 taken substantially on the line 2—2 shown in FIGURE 1.

FIGURE 3 is an enlarged fragmentary sectional plan view of a portion of the vanes shown in FIGURE 2 with the gas and droplet flow illustrated.

Referring in detail to FIGURES 1, 2 and 3, the mist collector device, generally designated 100, of this invention is illustrated. Device 100 is adapted for use in installations requiring or at least permitting a turn in the direction of gas flow since the inlet 101 to the device faces in a direction that is 90° from the direction that the outlet 102 faces. Appropriate ducting will usually be connected to both inlet 101 and outlet 102 for conducting the gas to and from the device. Device 100 includes a housing comprised of a top 103, a bottom 104 and bent inner and outer walls 105 and 106, respectively, with such walls extending between the top and bottom to form an enclosed passageway from the inlet 101 to the outlet 102. A plurality of turning vanes, generally designated 107 are provided in the passageway and extended between top 103 and bottom 104 with one such vane actually formed as an intergral part of outer wall 106. The vanes 107 are similar in outline cross-sectional configuration to thickened or air foil shape vanes that are sometimes used in conventional turning elbows of ducting systems for minimizing the inefficient pressure drop across the elbow that would otherwise occur due to turbulence and pressure changes resulting from changing the direction of gas flow. Each of the vanes 107 are comprised of two surfaces 108 and 109 converging near the inlet 101 and near the outlet 102. The surfaces 108 and 109 have curved and straight portions integrated to form the smooth vane shape of vanes 107. The surface 108 of one vane 107 cooperates with the surface 109 of the adjacent vane 107 to form a passageway of a particular configuration that produces an efficient turning of the gas flow as is well known to those skilled in the art.

An enclosed conduit 110 is formed in each vane 107 between the surfaces 108 and 109 of that vane. The surface 108 of each vane faces the incoming gas stream and thus as the direction of gas flow is changed the mist or liquid droplets 111 present in the gas stream will, by inertial effect, impinge on surface 108. These liquid droplets 111 will, by the viscous force of the gas-liquid interface, tend to migrate along surface 108 or wet the surface and form a film that tends to migrate along the surface in a downstream direction. A slot 112 is provided in each surface 108 near the downstream extremity of the curved, i.e., gas flow turning, portion of the surface whereby the turning of the gas stream is virtually completed before the slot on 112 is encountered by the gas stream. The slots 112 preferably extend substantially the entire distance between top 103 and bottom 104. A return flange 113 is preferably provided at slot 112 and integral with the upstream portion of surface 108 so as to form a continuous surface extending into conduit 110 of that vane 107. Flange 113 is closely spaced from a portion of the wall forming surface 109 thereby forming a narrow passageway 114 into conduit 110. A sump 115 is connected to the bottom 104 below the vanes 107 and an aperture 116 communicates each conduit 110 with the sump 115. It is preferred that apertures 116 be positioned adjacent the wall forming surface 109, as shown, so that if device 100 is positioned with inlet 101 facing vertically upward and outlet 102 facing horizontal the liquid will not tend to fill conduits 110. A blower 117 or like means is connected by a pipe 118 to the sump 115 for drawing the droplets of liquid and some gas from the conduits 110, through the apertures 116 and exhausting the liquid and gas to a suitable location preferably remote from inlet to the device 100. The blower 117 draws off only a small portion of the total quantity of gas entering inlet 101 and the major portion of the gas proceeds out the outlet 102.

As is well known to those skilled in the art, if a gas stream containing entrained liquid droplets is passed through a duct of substantial length some of the droplets will tend to collect on the walls of the duct and migrate along such walls. This occurs even though the duct is straight. Since device 100 may be provided with an inlet duct (not shown) connected to inlet 101, means are provided with device 100 for preventing this liquid on the walls of such an inlet duct from migrating through device 100 to outlet 102 along the walls of device 100, i.e. inner and outer walls 105 and 106, top 103 and bottom 104. Outer wall 106 has an integrally formed vane 107 with a slot 112, as heretofore described, and therefore the liquid migrating along wall 106 from the inlet will enter that slot 112. Inner wall 105 is provided with slot 120 communicating with a conduit 121 adjacent the wall whereby liquid migrating along the surface of wall 105 enters conduit 121 through slot 120. An aperture 122, similar to apertures 116, is provided in bottom 104 within conduit 121 for the liquid in conduit 121 to pass into sump 115 and be removed as previously described. A plurality of slots 125 are provided in top 103 and bottom 104 and extend between the surfaces 108 and 109 of separate adjacent vanes 107 and between surface 105 and the innermost surface 108. The slots 125 in bottom 104 are open to the sump 115 whereby liquid migrating along bottom 104 will pass into sump 115 and be discharged from device 100 as previously described. The slots 125 in top 103 open into a duct 126 which is similar to sump 115. Duct 126 is connected through a pipe 127 to a blower 128 or the like which draws the liquid migrating along top 103 and a portion of the gas stream through the slots 125 and discharged same to a convenient location. The slots 125 in top 103 and bottom 104 extend across substantially all of the passageway for the gas stream so that liquid migrating from inlet 101 along any portion of those surfaces will encounter a slot 125 and be drawn off.

Thus the droplets 111 impinging on surfaces 108 migrate to slots 112 as heretofore described, and proceed into conduits 110 through passageway 114 and this movement is enhanced by blower induced flow of gas into conduit 110 through slot 112 and through passageway 114. Similarly, droplets migrating along the surface of wall 105 will pass through slot 120 into conduit 121 and droplets migrating along the surfaces of top 103 and bottom 104 will pass through slots 125 and be discharged. Thus, in accordance with one of the objects of this invention, the droplets 111 being separated by inertial effect are rapidly removed through slots 112 from the effects of the gas steam that proceeds on to the outlet 102 thereby minimizing evaporation and re-entrainment of the droplets. Although device 100 is illustrated as forming a ducting elbow that turns the gas flow 90° which produces the substantial inertial effect desired, it will readily appear to those skilled in the art that the construction could be modified to produce a turning of less or more than 90° without departing from this invention.

The droplets of liquid removed from the stream of gas and entering conduits 110 may contain suspended or dissolve solids, such as salt, that will tend to adhere to the walls of conduits 110 or a particular liquid itself may tend to adhere to the walls of the conduits. Over a period of time the accumulation of adhering solids and liquids may tend to clog conduits 110, sump 115, duct 126 or passageway 114 thereby interfering with the heretofore described removal and draining of the droplets of liquid. In order to prevent this accumulation a wash-down assembly, generally designated 130, may be provided with device 100 for introducing a liquid at the top of each conduit 110 to wash out the conduits. The wash-down assembly 130 is comprised of a header having the necessary branch conduits connected to the interior of conduits 110. Any appropriate liquid may be used in wash-down assembly 130 that is compatible with the gas stream and the type of liquid droplets that are being removed from the gas stream. For example, if device 100 is employed for filtering air and it is likely that the liquid droplets 111 will usually be water, such as from rain or salt spray, then it would be appropriate to use water in the wash-down assembly 130. However, if it were known that in a particular installation the droplets 111 were likely to be an oily substance then it would be more advantageous to use an appropriate solvent in wash-down assembly 130. Wash-down assembly 130 may be operated either intermittently or continuously during operation of device 100 as is found to be most desirable for the particular device and conditions encountered. While device 100 has been described as preferably being positioned with vanes 107 extending vertically it is to be noted that the device may be otherwise oriented without adversely affecting its operation so long as the gravitational forces do not overcome the viscous forces causing the droplets to move from surfaces 108 into conduits 110, through apertures 116, and then out through sump 115.

Thus, it may be seen that by this invention there is provided a device that is capable of removing mist and droplets of liquid from a flowing gas stream and such removed liquid is rapidly extracted from the influence of the flowing gas stream thereby minimizing the possibility of evaporation or re-entrainment of the liquid in the gas stream. The device of this invention is particularly susceptible to operation with high velocities of flow of the gas stream which enhance the effectiveness of the device in contrast to the heretofore conventional devices that of necessity employed low velocities to avoid causing re-entrainment of the extracted liquid into the gas stream. Further the device of this invention is highly efficient in that only a minimal pressure drop occurs across the device. Thus the device of this invention is ideally suited for use with apparatus having high intake velocity and volume requirements such as turbine power plants although not limited to such use.

Having fully described our invention it is to be understood that we do not wish to be limited to the details herein set forth or to the details illustrated in the drawings, but our invention is of the full scope of the appended claims.

We claim:
1. A device for separating liquid droplets from a stream of gas flowing at a high velocity, comprising, a housing having an inlet portion for receiving the flowing gas and an outlet portion for discharging the flowing gas without the liquid droplets, a plurality of spaced-apart vanes mounted in said housing and extending across the substantially entire flow path of said stream of gas and from said inlet portion to said outlet portion, each said vane having a thin leading edge facing said inlet portion and a thin trailing edge facing said outlet portion for causing a smooth gas flow to and from said vane relative to said housing inlet and outlet portions, each of said vanes having a pair of convex and concave external surfaces unequally and smoothly curved in the same direction and extending between said leading and trailing edges and forming a thickened cross-section, each said vane surface having a curvature and spaced from the juxtaposed vane surface of the next adjacent vane for causing a relatively uniform flow area between vanes from said leading edge to said trailing edge for efficiently turning the gas stream from the direction of flow in the inlet portion to the direction of flow in the outlet portion, said concave vane surfaces confronting the gas flowing from the inlet portion for the liquid droplets to impinge thereon, each said vane having a narrow slot in said concave surface extending transversely across substantially the entire gas flow path and located at substantially the termination of the trailing edge end of said concave surface for receiving the liquid droplets impinging on and migrating along said concave surface, each said vane slot positioned a substantially greater lateral distance from the leading edge of that vane than the lateral distance between the leading edge of that vane and the next adjacent vane, each said vane having an interior conduit means communicating with the said slot therein, and means communicating with each said vane conduit means and having means for causing continual bleeding-off of a portion of the stream of gas through both said slot and communicating means for discharging such portion of gas and the liquid droplets passing therethrough from the device.

2. The combination of claim 1 wherein each said vane includes a flange integral with said concave surface along the upstream extremity of said slot and extending beyond the plane of the said slot and concave surface into the said conduit means.

3. A device for separating liquid droplets from a stream of flowing gas comprising a housing having an inlet and an outlet angularly positioned relative to each other for the gas stream to enter the housing in one direction and to leave the housing in a direction at an angle to the direction of the entering gas stream, a plurality of vanes mounted in said housing having curved surfaces for causing the gas stream to change said direction of flow from said inlet to said outlet, one said surface of each vane confronting the entering gas stream for droplets to impinge on that said one surface and having a downstream portion relative to the direction of gas flow, conduit means provided with each said vane, and a slot means extending transversely of each said vane and communicating said conduit means with the downstream portion of said one surface of that vane for the droplets on said one surface to migrate through said slot means into said conduit means whereby the droplets are removed from the influence of the flowing gas stream, and fluid suction means connected to said conduit means for continually drawing off the droplets and gas from said conduit means.

4. The combination of claim 3 wherein said housing is formed by walls extending from said inlet to said outlet, slots are provided in said walls extending across the gas stream path for receiving liquid droplets migrating along said walls, and means communicating with said slots for drawing the droplets and a portion of the gas stream through said slots and out of said housing.

5. The combination of claim 3 wherein the said means communicating said conduit means with said one surface includes a return flange integral with the upstream portion of said one surface and extending beyond the plane of the slot and surface into said conduit means.

6. A device for separating liquid droplets from a stream of flowing gas comprising a housing having an inlet and an outlet angularly positioned relative to each other for the gas stream to enter the housing in one direction and to leave the housing in a direction at an angle to the direction of the entering gas stream, a plurality of vanes mounted in said housing having curved surfaces for causing the gas stream to change said direction of flow from said inlet to said outlet, the said surfaces of each said vane curved and shaped to form a thickened cross section for efficiently changing the gas flow direction, a surface of each vane confronting the entering gas stream for droplets to impinge on that said surface and having a downstream portion relative to the direction of gas flow, conduit means provided with each said vane, a slot means extending transversely of each said vane and communicating said conduit means with the downstream portion of that said surface of the vane, and fluid suction means for drawing a portion of said flowing gas into each said conduit means to draw the droplets through said communicating means into said conduit means and for exhausting such portion of gas and droplets from the device.

7. A device for separating liquid droplets from a stream of flowing gas comprising a housing having an inlet and an outlet angularly positioned relative to each other for the gas stream to enter the housing in one direction and to leave the housing in a direction at an angle to the direction of the entering gas stream, a plurality of vanes mounted in said housing having curved surfaces for causing the gas stream to change said direction of flow from said inlet to said outlet, the said surfaces of each said vane curved and shaped to form a thickened cross section for efficiently changing the gas flow direction, one said surface of each vane confronting the entering gas stream for droplets to impinge on that one surface and having a downstream portion relative to the direction of gas flow, conduit means provided with each vane and having a slot means extending transversely of said vane for communicating with the downstream portion of said one surface of that vane for receiving droplets migrating along said one surface, means for supplying fluid to the inside of each said conduit means for washing down the inside of said conduit means, and means connected to each of said conduit means and including fluid suction means for causing continual bleeding-off of a portion of said stream of gas through said slot means into said conduit means and discharging from the device such portion of gas and the droplets migrating into said conduit means.

References Cited by the Examiner

UNITED STATES PATENTS

| | | | |
|---|---|---|---|
| 1,603,878 | 10/1926 | Smith | 55—427 |
| 2,357,734 | 9/1944 | Haber | 55—442 X |
| 2,358,508 | 9/1944 | Hersh | 55—257 X |
| 2,474,695 | 6/1949 | Schneible et al. | 55—461 |
| 2,643,736 | 6/1953 | Smith | 55—440 |
| 3,053,030 | 9/1962 | Smith | 55—242 |
| 3,155,474 | 11/1964 | Sexton | 55—442 X |

FOREIGN PATENTS

| | | |
|---|---|---|
| 48,993 | 6/1938 | France. |
| 1,267,727 | 6/1961 | France. |
| 194,445 | 6/1906 | Germany. |
| 257,368 | 5/1912 | Germany. |
| 1,046,576 | 12/1958 | Germany. |

ROBERT F. BURNETT, *Primary Examiner.*

HARRY B. THORNTON, *Examiner.*

L. H. McCARTER, T. R. MILES, *Assistant Examiners.*